Oct. 9, 1928.
O. A. FREDERICKSON
ARMORED ELECTRIC CABLE
Filed Dec. 7, 1927
1,687,013
2 Sheets-Sheet 1
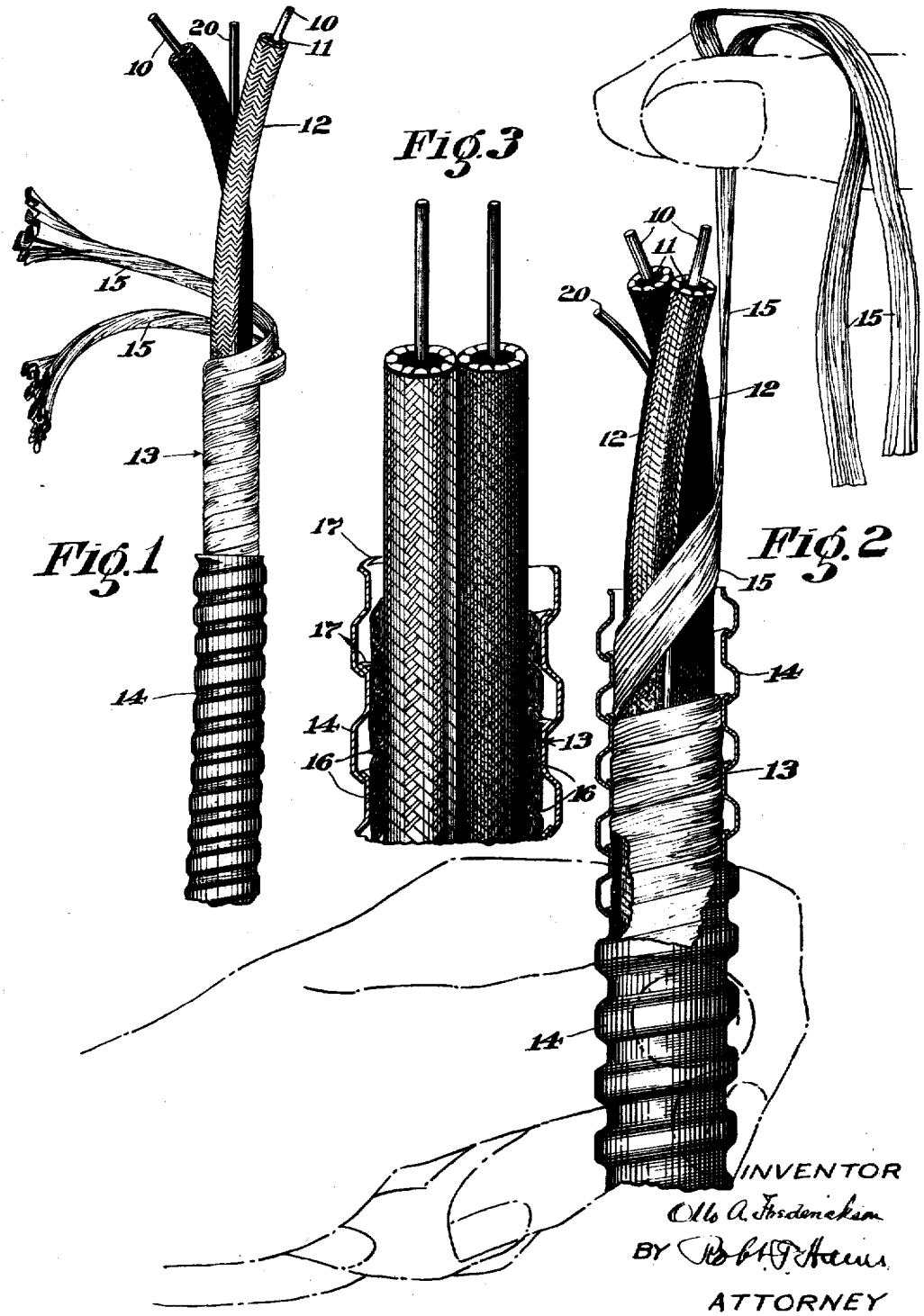

Oct. 9, 1928.
O. A. FREDERICKSON
ARMORED ELECTRIC CABLE
Filed Dec. 7, 1927    2 Sheets-Sheet 2
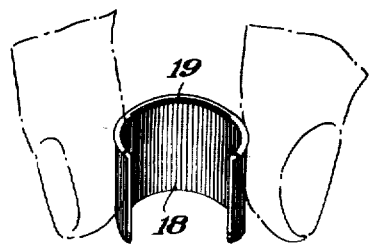
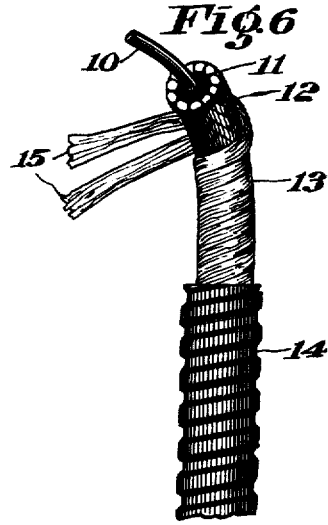
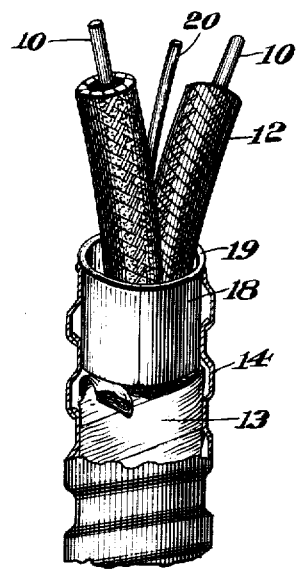
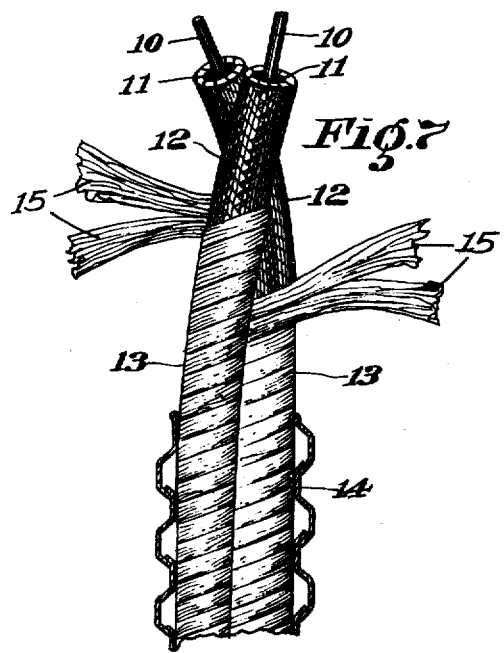
INVENTOR
Otto A. Frederickson
BY
ATTORNEY Patented Oct. 9, 1928.

1,687,013

UNITED STATES PATENT OFFICE.

OTTO A. FREDERICKSON, OF WETHERSFIELD, CONNECTICUT, ASSIGNOR TO NATIONAL ELECTRIC PRODUCTS CORPORATION, OF PITTSBURGH, PENNSYLVANIA, A CORPORATION OF DELAWARE.

ARMORED ELECTRIC CABLE.

Application filed December 7, 1927. Serial No. 238,356.

This invention relates to improvements in the construction of electric conductors having a metallic outer sheath or jacket, commonly known as armored cables or conductors, Cables of this general character ordinarily consist of two or more insulated conductors which are enclosed in an interlocked covering of insulated material, such as braided or woven fabric, and about which the spirally wound metallic jacket or sheath is placed, but such armored cables are open to many serious objections.

In the installation of such armored cables as heretofore made the outer metallic jacket or sheath is cut off some distance from the end of the enclosed conductors, in order to make attachments of the conductors to electric fixtures, and where the conductor or conductors have as heretofore been covered by interlocked strands, such for instance as woven or braided fabric, it has been further necessary after cutting the metallic sheath, to run a sharp instrument longitudinally of the exposed portions of the conductors to the end of the metallic sheath to sever the interlocked material longitudinally, and then cut the interlocked material transversely. These cutting operations are likely to injure the insulation upon the conductor wires, thus increasing the danger of short circuits. It has likewise been customary in cutting the metallic sheath to cut it transversely about the conductors with a sharp instrument which itself is likely to again injure the insulation, and in any event, the cut end portion of the metallic sheath will present burrs or sharp edges which are especially liable to penetrate or cut into the insulation, and thereby form short circuit.

In attempts to remedy this objectionable condition in the use of metallic armored cables, it has been customary heretofore to place an exterior metal sleeve or ferrule about the end of the metallic sheath. Such exterior ferrules or sleeves, however, are impractical because the metallic sheaths themselves vary in size and spirally, and unless the ferrule or sleeve was properly connected to the threaded or spiral portion of the outer sheath it was liable to be displaced, with the result that defective electrical or mechanical connection resulted. This defective condition has been the cause of much trouble and annoyance, but in addition thereto the exterior ferrule or sleeve as heretofore applied necessarily increased the diameter of the armored cable or sheath, so that the increased diameter due to the ferrule or sleeve prevents the enlarged end of the armored cable from entering the usual electrical fittings on the market, and either special fittings with proper openings had to be provided, or, as was more usually the case, they were dispensed with altogether.

An important feature of the present invention, therefore, consists of an insulated conductor or conductors which is, or are, wound with stripped material of an insulating fibrous nature, and associated with the end of the cut metallic sheath or armor, is a sleeve or ferrule which is interposed between the insulated conductor or conductors and the interior of the metallic sheath, whereby all cutting action by the sharp edges or burrs formed in serving the metallic sheath or armor is avoided.

Where the insulating fibrous material is laid spirally about the conductor or conductors, it is readily unwound from the exposed portion or ends of the conductors when the metallic sheath has been cut, and such removal is readily accomplished by an unwinding action which may be extended down into the metallic sheath itself, thereby providing sufficient space for the ready insertion of the interior bushing or sleeve, as hereinbefore referred to. By this construction it will be evident at once that the sharp edges and burrs at the end of the cut off armored or metallic sheath are prevented from injuring the insulation on the conductor or conductors.

In the preferred form of the invention in the respects above noted the bushing is formed of insulating material such as fibre, bakelite or the like, so that even should injury occur to the insulation of the conductor or conductors, the bushing will itself insulate the conductors from the metallic outer sheath.

Another important feature of the present invention consists in forming the bushing as a split tubular structure which normally has its adjacent longitudinally split edges in separated relation, so that the bushing may be applied about the conductor or conductors at a point adjacent the end of the cut off metallic armor or sheath and by pinching it or contacting its diameter it may be readily inserted between the inner surface of the metallic armor or sheath and the insulated conductor or conductors. Thus the objections heretofore existing in the old form of metallic armored or sheathed cables or conductors are readily overcome, short circuits absolutely prevented between the metallic sheath and enclosed conductor or conductors, and the diameter of the armored cable itself is not increased, so that it lends itself at once to direct application to the electrical fittings now in general use.

The use of a spirally wound insulating covering about the covered conductors, in place of the braided or woven outer coverings proposed heretofore, has a further advantage in that the spirally wound fibrous strip may be formed of material that is sufficiently compressible to constitute a cushion that fits snugly within the armored sheath or jacket, to thereby prevent sliding movement of the covered conductors within the armored sheath, whereby chafing of the covering against the inner walls of the metal sheath is prevented. Heretofore the insulating covering lying next to the armored sheath has been braided or woven, but it is difficult to prevent such braided or woven covering from sliding back and forth within the armored outer sheath with a chafing action; and to prevent this it has been customary to apply a coating of paraffin to the outer covering to fill or swell the same, but since paraffin possesses lubricating properties it will not entirely prevent the sliding movement of the covered conductors within the metal sheath. As above pointed out relative movement between the conductors and armored sheath is readily prevented, in accordance with the present invention, by forming the outer insulating covering of a cushioning material so that the coils of the armored sheath may sink sufficiently into the cushioning material to lock the parts against relative movement.

The use of an outer covering which is formed of a soft or compressible material wound spirally about the covered conductors has a further advantage in that if the adjacent coils of the insulating material are wound close together so that their edges overlap, the overlapping edges will sink into each other to form a smooth tight joint between the adjacent coils. As a result of these tight joints it will be practically impossible for the metal slivers which are sometimes formed upon the edges of the spirally wound strips of the armor to work through this outer covering and short circuit the conductors, whereas when the outer covering is woven or braided as heretofore, it is not difficult for these metal slivers to enter the interstices between the interbraided or interwoven strands.

The above and other features of the invention will be best understood from the following description when read in connection with the accompanying drawings illustrating good practical forms of the invention.

In the drawings:—

Fig. 1 is a side elevation of an armored cable constructed in accordance with the present invention, the covered conductors being shown as extending beyond the end of the armor;

Fig. 2 is an enlarged view similar to Fig. 1, part of the armor being shown in section;

Fig. 3 is an enlarged sectional view through the armored cable;

Fig. 4 is a perspective view of an expansion bushing to be described;

Fig. 5 is a perspective view showing the bushing mounted inside of the armor of the cable;

Fig. 6 is a side elevation of a modified construction showing an armored cable having a single insulated conductor; and Fig. 7 is a side elevation of a further modified armored cable construction.

In the drawings the armored cable is shown as provided with either one or two insulated electric conductors but it will be understood that the features of the present invention may also be employed in connection with armored cables having more than two insulated conductors.

In Figs. 1, 2, 3 and 5 of the drawings each electric conductor 10 is shown as having the usual form of insulation consisting of a rubber jacket 11 over which is provided a covering of braid 12, and about the two covered conductors thus formed is wound a novel protecting covering 13 of fibrous material that serves to unite the conductors and protect them from the outer metallic jacket or sheath 14.

The present invention is not concerned with the particular construction of the outer metallic jacket 14, and this jacket may be formed of a spirally wound metal strip in any well known or preferred manner.

While the spirally wound insulating covering 13 may be formed of practically any fibrous material that is strong and durable, it is found that excellent results are secured by forming the covering 13 of strips of thin flexible paper 15 that is crumpled transversely into a soft rounded strand as shown. The paper strips 15 may be untwisted, or if desired, they may have a slight twist, but it is preferable that the twist be not great enough to render the paper hard and non-compressible. The covering 13 is shown as formed of two spirally wound strips 15, but a greater or smaller number of strips may be employed.

The spiral coils of the strips 15 are preferably laid sufficiently close together to cause their adjacent edges to overlap as at 16, and since the strips forming the coils are relatively soft, their overlapping edges will sink into each other to form a smooth tight joint as shown. As a result of this construction it is practically impossible for the metal slivers such as 17 that are accidentally formed upon the edges of the metal strip, to enter the tightly closed joint 16.

The strip of metal forming the armored jacket 14 is preferably wound sufficiently tight about the covering 13 to cause the metal coils to sink slightly into the surface of the cushioning material 13 to thereby lock the covered conductors against sliding movement within the armored jacket.

As above stated an important feature of the present invention resides in means for preventing the covering for the conductors 10 from being cut or chafed by the sharp edges which are necessarily formed at the end of the armored jacket 14 when the jacket is cut transversely. This is accomplished by providing a bushing or sleeve 18 which is preferably cut longitudinally as shown in Fig. 4 so that the sleeve may be opened out sufficiently to permit its insertion laterally over the covered conductors. The bushing may be made of spring metal if desired, but is preferably made of insulating material, and may be compressed between the fingers, as will be apparent from Fig. 4 to facilitate the insertion of the bushing within the end of the armor 14.

Before the bushing 18 may be inserted in the armored sheath it is necessary to provide a clearance space for the bushing, but this is readily done by drawing several coils of the fibrous material 15 out of the space between the covered conductors 12 and metal sheath 14 as will be apparent from Fig. 2, whereupon the expansion bushing may be readily inserted to its final position in which it is shown in Fig. 5. The expanding action of the bushing will hold it in place in the armored sheath, and the bushing is preferably provided with a flange 19 at its outer end that will abut against the end of the armored sheath.

The bushing 18 is not only easy to insert in the end of the armored sheath, but it provides a smooth surface for the covered conductors and eliminates any chance of the insulation upon the conductors being injured by the edges at the end of the armored sheath. Furthermore, it constitutes a reenforcing sleeve or support for the inner wall of the metal sheath. This will facilitate the securing of a clamp or other form of attachment tightly about the outer end of the reenforced armor preparatory to securing the armor to the casing of an outlet box.

The insulating covering 12 and 13 may be treated with any of the usual moisture proofing compounds, and if desired a ground wire 20 may be laid alongside the covered conductors 12 so that it is enclosed and protected by the covering 13. This ground wire is highly desirable as it forms a dependable ground between the outlet boxes to which the conductors may be connected, but such ground wire is not claimed herein as it has been made the subject matter of a separate application filed by me.

The modified construction shown in Fig. 6 differs from the construction shown in Figs. 1, 2, 3 and 5 only in that in Fig. 6 the protecting covering 13 is wound about a single insulated conductor 12, and the metallic jacket 14 is placed about this single conductor, whereas in Figs. 1, 2, 3 and 5 the covering 13 surrounds and unites two insulated conductors which are protected by the armor 14. In the modified construction of Fig. 7 each insulated conductor is provided with a protecting covering 13 which may be removed without disturbing the covering 13 upon the other conductor, and these two conductors are enclosed in the metallic jacket 14. In each of the constructions shown and described several coils of the protecting material 15 may be pulled out from the interior of the armored jacket 14 to form a clearance space for the bushing 18.

In the armored cables employed heretofore it has been customary to provide a braided or woven jacket over the two or more covered insulated conductors and then apply the armored covering directly over the braided or woven jacket in relatively snug engagement with the bracket. There is therefore not sufficient room between the metal covering and outer jacket of the armored cables constructed heretofore to receive a bushing 18, and it is practically impossible to remove a sufficient amount of the braided or woven jacket from the interior of the armored covering to form a sufficient clearance space to receive the bushing 18.

This difficulty is entirely overcome by employing the construction of the present invention, since the spirally wound covering 13 may be easily stripped off of the conductors 12 to produce the desired clearance for a bushing 18. The use of a spirally wound covering 13 has the further advantage in that it is much easier for the wireman to remove than braid, since he need simply unwind the former while he must cut the latter. Furthermore, the use of a spirally wound outer covering which the wireman can readily unwind without any cutting operation avoids injury to the underlying insulation, whereas when a braided outer covering is used the underlying insulation is frequently injured by the wireman as he cuts away the outer braided covering, and any injury to the underlying insulation necessarily increases the fire hazard.

What is claimed is:

1. An armored electric conductor comprising, an insulated wire, a protecting covering of insulating material surrounding the insulated wire, a metallic sheath or jacket enclosing the protecting covering and insulated wire, and a bushing interposed between the insulated wire and the metallic sheath or jacket to protect the wire insulation from the edge formed at the end of the metallic sheath or jacket.

2. An armored electric conductor comprising, an insulated wire, a protecting covering of insulating material surrounding the insulated wire, a metallic sheath or jacket enclosing the protecting covering and insulated wire, and a bushing of insulating material interposed between the insulated wire and the metallic sheath or jacket to protect the wire insulation from the edge formed at the end of the metallic sheath or jacket.

3. An armored electric conductor comprising, an insulated wire, a protecting covering of insulating material surrounding the insulated wire, a metallic sheath enclosing said covering and insulated wire, and a split bushing interposed between the insulated wire and the metallic sheath to protect the wire insulation from the edge formed at the end of the metallic sheath.

4. An armored electric conductor comprising, an insulated wire, a protecting covering of insulating material wrapped around the insulated wire, a metallic sheath enclosing said covering and insulated wire, a bushing interposed between the insulated wire and the metallic sheath to protect the wire insulation from the edge formed at the end of the metallic sheath, and a flange at the outer end of the bushing adapted to abut against the end of the metallic sheath.

5. An armored electric cable comprising, insulated electric conductors laid side by side, a protecting covering of insulating material surrounding the insulated conductors, a metallic sheath enclosing said protecting covering and conductors, and a bushing interposed between the insulated conductors and the metallic sheath to protect the insulation of the conductors from the edge formed at the end of the metallic sheath.

6. An armored electric cable comprising, insulated electric conductors laid side by side, a protecting covering of insulating material surrounding and uniting the insulated conductors, a spirally wound metallic sheath enclosing said protecting covering and conductors, and a bushing interposed between the insulated conductors and metallic sheath to protect the insulation of the conductors from the edge formed at the end of the metallic sheath.

7. An armored electric conductor comprising, an insulated wire, a metallic sheath enclosing the insulated wire, a protecting covering for the insulated wire comprising a strip of insulating material interposed between the insulated wire and metallic sheath and adapted for ready removal from the interior of the end portion of the metallic sheath to provide a clearance space between the sheath and insulated wire, and a protecting bushing mounted in said clearance space between the interior of the end portion of the metallic sheath and the insulated wire.

8. An armored electric conductor comprising, an insulated wire, a metallic sheath enclosing the insulated wire, a protecting covering for the wire comprising a strip of fibrous material laid spirally about the covered wire beneath the metallic sheath and constructed so that one or more coils may be stripped off of the covered wire from under the metallic sheath, and a bushing adapted to be inserted within an end of the metallic sheath in the clearance space formed by removing one or more coils of said fibrous material.

9. An armored electric cable comprising, insulated electric conductors laid side by side, a protecting covering surrounding the insulated conductors and formed of insulating material wound about the conductors, a metallic outer sheath enclosing the insulated conductors and protecting covering, a protecting bushing constructed to be inserted within an end portion of the metallic sheath, and the covering of insulating material being formed so that it may be pulled out of the end portion of the metallic sheath for a sufficient distance to form a clearance space for said bushing.

10. An armored electric cable comprising, insulated electric conductors laid side by side, an armored outer sheath formed of a metal strip wound spirally about the conductors, a protecting covering surrounding and uniting the covered conductors and formed of insulating material laid in coils about the insulated conductors beneath the armored sheath so that one or more coils may be removed from the interior of the end portion of the armored sheath to form a bushing receiving clearance space, and a protecting bushing adapted to be inserted in said clearance space between the armored sheath and conductors and provided with a flange adapted to abut against the end of the armored sheath.

In testimony whereof, I have signed my name to this specification.

OTTO A. FREDERICKSON.

DISCLAIMER 1,687,013.—*Otto A. Frederickson*, Wethersfield, Conn. ARMORED ELECTRIC CABLE. Patent dated October 9, 1928. Disclaimer filed December 8, 1932, by the patentee, the assignee, *National Electric Products Corporation*, acquiescing.

Hereby enters this disclaimer to that part of the claim in said Letters Patent which is in the following words, to wit: claims numbered 1, 3, 4, 5, and 6, said claims reading as follows:

"1. An armored electric conductor comprising, an insulated wire, a protecting covering of insulating material surrounding the insulated wire, a metallic sheath or jacket enclosing the protecting covering and insulated wire, and a bushing interposed between the insulated wire and the metallic sheath or jacket to protect the wire insulation from the edge formed at the end of the metallic sheath or jacket."

"3. An armored electric conductor comprising, an insulated wire, a protecting covering of insulating material surrounding the insulated wire, a metallic sheath enclosing said covering and insulated wire, and a split bushing interposed between the insulated wire and the metallic sheath to protect the wire insulation from the edge formed at the end of the metallic sheath.

"4. An armored electric conductor comprising, an insulated wire, a protecting covering of insulating material wrapped around the insulated wire, a metallic sheath enclosing said covering and insulated wire, a bushing interposed between the insulated wire and the metallic sheath to protect the wire insulation from the edge formed at the end of the metallic sheath, and a flange at the outer end of the bushing adapted to abut against the end of the metallic sheath.

"5. An armored electric cable comprising, insulated electric conductors laid side by side, a protecting covering of insulating material surrounding the insulated conductors, a metallic sheath enclosing said protecting covering and conductors, and a bushing interposed between the insulated conductors and the metallic sheath to protect the insulation of the conductors from the edge formed at the end of the metallic sheath.

"6. An armored electric cable comprising, insulated electric conductors laid side by side, a protecting covering of insulating material surrounding and uniting the insulated conductors, a spirally wound metallic sheath enclosing said protecting covering and conductors, and a bushing interposed between the insulated conductors and metallic sheath to protect the insulation of the conductors from the edge formed at the end of the metallic sheath."

[*Official Gazette January 3, 1933*]